United States Patent [19]

Trapasso

[11] 3,975,341

[45] Aug. 17, 1976

[54] WATER IN OIL EMULSION PROCESS FOR PREPARING GEL-FREE POLYELECTROLYTE PARTICLES

[75] Inventor: Louis E. Trapasso, Watchung, N.J.

[73] Assignee: Celanese Corporation, New York, N.Y.

[22] Filed: Aug. 5, 1974

[21] Appl. No.: 494,668

[52] U.S. Cl. .................. 526/303; 260/29.6 WQ; 260/79.3 M; 526/88; 526/207; 526/210; 526/229; 526/911; 528/503

[51] Int. Cl.[2] .............. C08F 120/52; C08F 120/70; C08F 122/30; C08F 200/00

[58] Field of Search ............ 260/79 SC, 79.3, 80 M, 260/80.3 M, 80.73, 808, 86.1 N, 89.5 AW, 89.7 R, 89.7 N, 296 WQ

[56] References Cited
UNITED STATES PATENTS

| | | | |
|---|---|---|---|
| 2,135,443 | 11/1938 | Strain | 260/86.1 E X |
| 2,904,541 | 9/1959 | Barrett | 260/80 M |
| 2,982,749 | 5/1961 | Friedrich et al. | 260/80 M X |
| 3,041,318 | 6/1962 | Hess | 260/80 M |
| 3,211,708 | 10/1965 | Zimmermann et al. | 260/89.7 R X |
| 3,278,506 | 10/1966 | Chamot et al. | 260/80 M |
| 3,284,393 | 11/1966 | Vanderhoff et al. | 260/89.7 R |
| 3,336,270 | 8/1967 | Monague | 260/89.7 R |
| 3,450,680 | 6/1969 | Jursich et al. | 260/29.6 |

FOREIGN PATENTS OR APPLICATIONS 1,102,708  2/1968  United Kingdom ................ 450/701

*Primary Examiner*—Harry Wong, Jr.
*Assistant Examiner*—Herbert J. Lilling

[57] ABSTRACT

There is provided a process for preparing polyelectrolytes by a water-in-oil emulsion process. A water-in-oil azeotropic emulsion is heated with agitation and a concentrated aqueous solution of small amounts of a polymerization initiator and gel inhibitor and at least one water-soluble vinyl monomer adapted to polymerize at reflux temperature with a concomitant loss of water by azeotropic distillation is added thereto to polymerize said water-soluble monomer.

The polymerized product including a gel inhibitor forms a gel-free aqueous solution.

14 Claims, No Drawings

WATER IN OIL EMULSION PROCESS FOR PREPARING GEL-FREE POLYELECTROLYTE PARTICLES

BACKGROUND OF THE INVENTION

Inverse emulsion (i.e., water-in-oil) polymerization techniques are well-known. For example, U.S. Pat. No. 3,284,393 discloses a process for thermally polymerizing water-soluble monomers to high molecular weight polymers or copolymers at rapid rates of polymerization using water-in-oil emulsion polymerization procedures in which at least one water-soluble monomer (which may be in aqueous solution) is emulsified in an oil phase by means of a water-in-oil emulsifier and emulsion polymerized under free radical forming conditions to form a polymeric latex in which the oil phase is the dispersion medium. A process such as above-described may be utilized to form acrylamide polymers. However, such a process is not applicable to producing such polymers in particulate form. Further, such polymerization processes are exothermic and tend to initiate at reflux temperatures. This may result in boil over (i.e., solvent and other components of the solution shooting out of the top of the condenser) from the refluxing emulsion.

Water-soluble, high molecular weight acrylamide polymers, such as polyacrylamide, are conventionally utilized in dilute aqueous solution. Unless special precautions are taken, the initial dispersion of the polymer (generally in particulate form) is likely to agglomerate to form partially hydrated gels which are slow to dissolve and which have a tendency to plug liquid handling equipment. Although complete dissolution of these gels is possible, its achievement may require extended time periods or special treatments. The gels can be removed by special techniques which are not only expensive but which also waste polymer.

OBJECTS AND SUMMARY OF THE INVENTION

Accordingly, a general object of the present invention is to avoid or substantially alleviate the above problems with the prior art.

A more specific object of this invention is the provision of a process for producing particulate polymers by an inverse emulsion technique.

A further specific object of this invention is to provide a process for the production of particulate polymers which form gel-free aqueous solutions without special gel-removing techniques.

Another object of this invention is to provide a process for the production of particulate polymers by an inverse emulsion process which polymers form gel-free aqueous solutions and the resulting particulate polymers.

Still another object of this invention is to provide a process for producing particulate polymers by an inverse emulsion technique whereby solution boil over is substantially eliminated.

Other objects and advantages of the present process will become apparent from the following summary and description of the preferred embodiments of the present invention.

In one aspect of the present invention there is provided an inverse emulsion process for producing polymer particles which form gel-free aqueous solutions which process comprises refluxing an azeotropic emulsion mixture of a major amount of oil and a minor amount of water, and adding to the refluxing mixture an aqueous solution containing a polymerization initiator and at least about 50 percent by weight of the solution of at least one water-soluble, oil insoluble, ethylenically unsaturated monomer adapted to polymerize under refluxing conditions whereby the said monomer polymerizes in particulate form.

In another aspect, the present invention provides the particulate polymers resulting from the above-defined process.

DESCRIPTION OF THE PREFERRED EMBODIMENTS

In accordance with the process of the present invention, all known polymerizable water-soluble ethylenically unsaturated monomers the polymers of which are insoluble in the continuous oil phase can be polymerized by a water-in-oil emulsion polymerization process, particularly by the addition of an aqueous feed solution of the monomer and a polymerization initiator to a refluxing water-in-oil azeotropic emulsion mixture, to form particles of the polymeric material.

In this specification, the term "water-soluble, oil-insoluble monomer" is intended to include not only particular water-soluble, oil-insoluble monomers but is also intended to include combinations of two or more such monomers which when polymerized produce copolymers, terpolymers, etc. The water-soluble monomers of the present process include acrylamide, methacrylamide, acrylic acid, alkali metal salts of acrylic acid, methacrylic acid, dimethylaminoethyl methacrylate, vinylbenzyl trimethylammonium chloride, alkali metal and ammonium salts of 2-sulfoethylacrylate, sodium styrene sulfonate, 2-aminoethylmethacrylate hydrochloride, alkali metal and ammonium salts of vinylbenzyl sulfonates and the like. Preferably, the aqueous feed solution includes acrylamide or methacrylamide as the monomer or as one of the monomers.

Polymerization initiators adapted to initiate polymerization of the ethylenically unsaturated monomer under refluxing conditions include peroxide catalysts such as t-butyl hydroperoxide. Polymerization initiators also include redox systems such as t-butyl hydroperoxide, ammonium persulfate, or potassium persulfate in combination with conventional reductants (e.g., sodium metabisulfite, zinc formaldehyde sulfoxylate, and sodium formaldehyde sulfoxylate). A preferred polymerization initiator/reductant combination is potassium persulfate and sodium metabisulfite.

The polymers (particularly the homopolymers and copolymers of acrylamide, acrylic acid, and the sodium salt of acrylic acid) produced by an inverse emulsion polymerization process do not ordinarily form gel-free aqueous solutions. Although the theoretical mechanism of such gelling is unclear, it is believed that cross-linking may occur via grafting of acrylamide monomer onto preformed polyacrylamide.

To combat this gel formation and provide polymer products which form gel-free aqueous solutions for those end uses which require or benefit from gel-free aqueous solution, a gel inhibitor may be added to the aqueous monomer feed. Suitable gel inhibitors include isopropyl alcohol, isobutyl alcohol, glycerol and 1,3-butylene glycol. The use of 1,3-butylene glycol yields particularly advantageous results.

The water-soluble, oil-insoluble ethylenically unsaturated monomer can be present in varying concentrations in the aqueous solution added to the refluxing azeotropic water-in-oil emulsion mixture but is generally present in a concentration of from 50 or more to about 70, typically from about 55 to about 65, and preferably from about 60 to about 64, percent by weight based upon the total weight of the aqueous solution.

In a particularly preferred embodiment of the present invention, the aqueous feed solution includes acrylamide (or methacrylamide) as one of the monomers. The acrylamide (or methacrylamide) and the other monomers can be present in any weight ratio, but generally a weight ratio of acrylamide to the "other" monomer of from about 20:1 to about 1:1, typically from about 10:1 to about 1.5:1, and preferably from about 4:1 to about 1.9:1 is employed.

The aqueous solution contains water in a concentration generally of from about 30 to about 50, typically from about 35 to about 45, and preferably from about 36 to about 40 percent by weight based upon the total eight of the aqueous solution.

The polymerization initiator is present in a minor amount sufficient to initiate polymerization at the reflux temperature, which amount is generally from about 0.001 to about 0.05, typically from about 0.005 to about 0.04, preferably from about 0.008 to about 0.03, percent by weight based upon the total weight of the aqueous solution.

The concentration of gel inhibitor can also vary but the gel inhibitor when present will be utilized in a minor amount sufficient to substantially avoid gel formation when the resulting polymer is dissolved in water. The gel inhibitor is generally present in an amount of from about 0.1 to about 3.0, typically from about 0.15 to about 2.5, and preferably from about 0.20 to about 2.0, percent by weight based upon the total weight of the aqueous solution.

The water-in-oil azeotropic emulsion to which the aqueous monomer solution is added under refluxing conditions comprises a major amount of oil and a minor amount of water and an emulsifier.

The oil phase can be any inert hydrophobic liquid in which the water-soluble ethylenically unsaturated monomer is insoluble, which forms an azeotropic mixture with minor amounts of water and which can readily be separated from the disperse phase polymeric product. Such liquids include toluene, xylene, o-dichlorobenzene, monochlorobenzene, ethylene dichloride, and the like. Hydrocarbons and chlorohydrocarbons such as perchloroethylene are advantageous. Arylhydrocarbons such as toluene and xylene are particularly preferred oil phase liquids.

The particular composition of the water-in-oil mixture will, of course, vary depending upon the particular materials chosen although a higher percentage of oil than water will always be present in the mixture. Generally, the oil is present in the water-in-oil emulsion in an amount of from about 36 to about 95, typically from about 50 to about 85, preferably from about 60 to about 75, percent by weight based upon the total weight of the reaction mixture while the water is generally present in an amount of from about 0.1 to about 35, typically from about 0.5 to about 20, and preferably from about 0.9 to about 12, percent by weight based upon the total weight of the reaction mixture.

The water-in-oil emulsion also generally contains an emulsifier in a concentration sufficient to emulsify the water and oil which amount is generally from about 1.0 to about 10.0, typically from about 1.5 to about 6.0, and preferably from about 2.0 to about 4.0, percent by weight based upon the total weight of the reaction mixture.

The water-in-oil emulsifying agents which can be used in the present process include sorbitan monooleate, sorbitan monostearate, diglycerol monostearate, and their ethoxylated derivatives.

The present process may be carried out at any pressure — i.e., atmospheric, subatmospheric, or superatmospheric pressure although generally substantially atmospheric pressure is preferred.

The refluxing temperature of the water-in-oil azeotropic mixture will vary depending upon the particular azeotropic mixture formed but is generally in the range of from about 85 to about 110, typically from about 87 to about 105, and preferably from about 90° to about 95°C.

In practice, the water-in-oil azeotropic emulsion can be prepared by dissolving the water-in-oil emulsifying agent in the oil phase and admixing the water with agitation. The aqueous monomer feed solution can be prepared by dissolving the monomer (or monomers) in water and then admixing with agitation the polymerization initiator and gel inhibitor.

The water-in-oil azeotropic emulsion is then heated to reflux with vigorous agitation. The aqueous monomer feed solution is thereafter continuously added to the refluxing water-in-oil azeotropic emulsion with continued vigorous agitation.

Agitation can be effected by employing any conventional stirrer. The rate of addition of aqueous monomer feed solution to the water-in-oil emulsion can vary and is dependent upon the amount of water-in-oil emulsion present as well as the particle size and shape desired. The rate of addition of monomer can be empirically determined in accordance with the above parameters. Exceedingly fast rates may result in particle agglomeration. Agglomeration can be prevented simply by decreasing the rate of addition.

The incremental addition of aqueous monomer feed in the process of the present invention substantially eliminates the boil over of solvent and other solution materials from the refluxing mixture.

Polymerization occurs essentially immediately and water is azeotropically separated to dry the product. The water may be separated either at the time of the addition of monomer or after all the addition is completed. The latter method is preferred. The water can be removed by placing a Dean-Stark trap into the vapor line of the system.

The polymerization medium containing the desired particulate polymeric product is then cooled to room temperature and the product isolated by suction filtration.

The product formed is granular and uniform in particle size. Each particle appears to be an aggregation of tiny spheres. Generally, the product obtained has an average particle diameter of from about 1 to about 10,000, typically from about 10 to about 1000, and preferably from about 100 to about 500, microns.

The product is obtained in a yield of generally at least 92, typically at least 95, and preferably at least 97, percent by weight based on the theoretical yield from the monomer feed.

The Brookfield viscosity of a 1 percent aqueous solution of these polymer particles is typically in the range of from about 100 to about 500 centipoise.

The polymeric particles of the present invention are useful as binders in coating compositions, as flocculating, suspending or thickening agents and as friction reduction and antistatic agents.

The present invention is further illustrated by the following Examples which are to be considered as illustrative of the present invention. It should be understood, however, that the invention is not limited to the specific details of the Examples. All parts and percentages in the Examples as well as in the specification and claims are by weight unless otherwise specified.

EXAMPLE I

An azeotropic water-in-oil emulsion mixture is formed by mixing 370 g. of toluene, 5 g. of water and 12.5 g. of a surfactant (sorbitan monooleate). The sorbitan monooleate is added to the toluene with stirring and the water is then added.

A concentrated aqueous monomer feed solution containing 63.8 percent ethylenically unsaturated monomers is formed by mixing the following:

| Component | Amount |
|---|---|
| Acrylamide | 52.5 g. |
| Quaternized Dimethylaminoethyl methacrylate | 22.5 g. |
| Water | 42.5 g. |
| Ammonium persulfate (polymerization initiator) | 0.01 g. |
| 1,3-butylene glycol (gel inhibitor) | 0.5 g. |

The dimethylaminoethyl methacrylate is obtained from the Alcolac Chemical Company. This material is quaternized by reaction at a temperature of 68° to 70°C. for 4.5 hours with 4-chloro-2-butenyl trimethylammonium chloride in the presence of water (as described, for example, at column 9 of U.S. Pat. No. 3,689,468) and has the following composition as determined by combined gas chromatography and mass spectrometry.

| Component | Percentage |
|---|---|
| Water | 0.29 |
| Methylmethacrylate | 0.98 |
| Dimethylaminoethanol | 4.80 |
| Dimethylaminoethyl methacrylate | 93.94 |

The quaternized dimethylaminoethyl methacrylate is added as a 40 percent by weight aqueous solution (56.25 grams of this solution contains 22.50 grams of quaternized dimethylaminoethyl methacrylate and 33.75 grams of water).

The concentrated aqueous monomer solution is prepared by dissolving the acrylamide in the quaternized dimethylaminoethyl methacrylate solution and then admixing, with agitation, the ammonium persulfate and 1,3-butylene glycol.

Both mixtures are formed at atmospheric pressure and 25°C.

The water-in-toluene azeotropic emulsion is heated to reflux (about 85°C.) at atmospheric pressure. The monomer solution is then continuously and uniformly added to the refluxing water-in-toluene emulsion over a period of 1 hour. During addition, the azeotropic vapor temperature remains at about 86°C. and the pot temperature remains at about 91°C. Immediately following termination of the continuous delayed addition of monomer solution, a Dean-Stark trap is placed into the vapor line and water is azeotropically separated to dry the product. Upon cooling to room temperature, the product is isolated by suction filtration. The polymer particles are granular, uniform in particle size (about 250 microns average particle diameter). Each particle appears to be an aggregate of tiny spheres. The Brookfield viscosity of a 1 percent (by weight) aqueous solution of these particles is 150 centipoise and the solution is essentially gel-free.

The product is obtained in a yield of 99 percent of theory based upon acrylamide and quaternized DMAEMA feed.

EXAMPLES II - VI

These Examples illustrate the effect on gel formation in the resulting polymer by varying the concentration of gel inhibitor in the aqueous monomer solution. In each run, the 1,3-butylene glycol gel inhibitor (if any) is mixed with an aqueous monomer feed of 42.5 grams of acrylamide, 56.5 grams of 40 percent by weight quaternized dimethylaminoethyl methacrylate, 0.025 g. ammonium persulfate (polymerization initiator) and 9 grams of water. The other experimental conditions including the amounts of toluene, water, and emulsifier in the azeotropic water-in-oil emulsion are the same as in Example I. The amount of 1,3-butylene glycol in the aqueous monomer feed as well as the viscosity of a 1 percent aqueous solution of the resulting isolated solid polymer particles and observed gel formation (if any) in the solution are shown below in Table I.

TABLE I

| Example No. | Grams 1,3-butylene glycol | 1% aqueous Brookfield viscosity (centipoise) | Comments |
|---|---|---|---|
| II | 0 | 212 | substantial gel |
| III | 2.0 | 87 | gel free |
| IV | 1.0 | 100 | gel free |
| V | 0.5 | 150 | gel free |
| VI | 0.25 | 162 | slight gel |

These Examples illustrate that even minor amounts (i.e., 0.5 g. per 496 g. total mixture) of the gel inhibitor (1,3-butylene glycol) result in gel-free solutions of the polymer particles even with very minor amounts of a polymerization initiator. Even the addition of 1,3-butylene glycol in an amount of only 0.25 g. to an aqueous monomer feed solution of a total weight of 108 g. results in significantly improved (i.e., decreased) gel formation and viscosity compared with the run containing 0 g. of the 1,3-butylene glycol. The particles of Example II are granular and uniform in particle size and useful in those situations in which a gel-free aqueous solution is unnecessary.

Although I do not wish to be bound by theoretical conditions, it appears that the gel inhibitor functions as a chain transfer agent or as a polymer modifier in providing a site for hydrogen extraction by growing polymer chains thus preventing hydrogen atom extraction and grafting to the already formed polymer.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. An inverse emulsion polymerization process for preparing polymer particles which form gel-free aqueous solutions which process comprises:
   a. refluxing with vigorous agitation an azeotropic emulsion mixture consisting essentially of a major amount of oil and a minor amount of water and an emulsifier; and
   b. continuously adding to the agitated, refluxing emulsion mixture an aqueous solution containing a polymerization initiator and at least about 50 percent by weight of the solution of at least one water-soluble, oil insoluble ethylenically unsaturated monomer adapted to polymerize under reflux conditions whereby the said monomer polymerizes essentially immediately in particulate form.

2. The process of claim 1 wherein the oil is toluene.

3. The process of claim 2 wherein at least one water-soluble monomer is acrylamide and wherein the aqueous solution further contains a minor amount of a gel inhibitor.

4. The process of claim 3 wherein the aqueous monomer solution is added to the refluxing water-in-oil emulsion at a temperature of from about 85° to about 110°C. and at substantially atmospheric pressure.

5. The process of claim 4 wherein the gel inhibitor is 1,3-butylene glycol.

6. The process of claim 5 wherein the emulsifier is sorbitan monooleate.

7. An inverse emulsion polymerization process for preparing polyacrylamide particles which process comprises:
   a. heating to reflux an azeotropic water-in-toluene emulsion wherein the water-in-toluene emulsion consists essentially of from about 36 to about 95 percent by weight toluene, from about 0.1 to about 35 percent by weight water, and from about 1.0 to about 10.0 percent by weight emulsifier based on the total weight of the reaction mixture;
   b. vigorously agitating said refluxing azeotropic water-in-toluene emulsion;
   c. continuously adding to said agitated, refluxing azeotropic water-in-toluene emulsion a concentrated aqueous solution of acrylamide with small amounts of ammonium persulfate and 1,3-butylene glycol wherein said aqueous acrylamide solution contains from about 50 to about 70 percent by weight acrylamide, from about 30 to about 50 percent by weight water, from about 0.001 to about 0.05 percent by weight polymerization initiator, and from about 0.1 to about 3.0 percent by weight 1,3-butylene glycol based on the total weight of the aqueous solution whereby the said monomer polymerizes essentially immediately forming particulate polymers; and
   d. recovering said particulate acrylamide polymers from said polymerization medium.

8. The process of claim 7 wherein said aqueous acrylamide solution also contains another ethylenically unsaturated comonomer wherein the weight ratio of acrylamide to the other monomer is from about 20:1 to about 1:1.

9. The process of claim 7 wherein the water-in-toluene emulsion contains from about 50 to about 85 percent by weight toluene, from about 0.5 to about 20 percent by weight water, and from about 1.5 to about 6.0 percent by weight emulsifier based on the total weight of the reaction mixture, and wherein said aqueous acrylamide solution contains from about 55 to about 65 percent by weight acrylamide, from about 35 to about 45 percent by weight water, from about 0.005 to about 0.04 percent by weight polymerization initiator, and from about 0.15 to about 2.5 percent by weight 1,3-butylene glycol based on the total weight of the aqueous solution, 10. The process of claim 8 wherein the aqueous acrylamide solution is added to the water-in-toluene emulsion at a temperature of from about 87° to about 105°C. and at substantially atmospheric pressure.

11. The process of claim 8 wherein the polyacrylamide particles are dried by azeotropically removing the water and the polyacrylamide particles are further dried by suction filtration.

12. An inverse emulsion polymerization process for preparing polymer particles which process comprises:
   a. refluxing an azeotropic water-in-toluene emulsion consisting essentially of from about 0.9 to about 12 percent by weight of water, from about 60 to about 75 percent by weight of toluene, and from about 2.0 to about 4.0 percent by weight of an emulsifying agent based upon the total weight of the reaction mixture;
   b. vigorously agitating said refluxing water-in-toluene emulsion;
   c. continuously adding to the agitated, refluxing azeotropic water-in-toluene emulsion a concentrated aqueous solution of from about 60 to about 64 percent by weight of at least one ethylenically unsaturated monomer, from about 36 to about 40 percent by weight of water, from about 0.008 to about 0.03 percent by weight of a polymerization initiator and from about 0.20 to about 2.0 percent by weight of a gel inhibitor based upon the total weight of the aqueous solution at a temperature of from about 90° to about 95°C. and at substantially atmospheric pressure thereby polymerizing said monomer essentially immediately, and
   d. recovering said polymerized product.

13. The process of claim 12 wherein said ethylenically unsaturated monomer comprises acrylamide and at least one other ethylenically unsaturated comonomer in a weight ratio of acrylamide to the other monomer of from about 10:1 to about 1.5:1.

14. The process of claim 13 wherein said gel inhibitor is 1,3-butylene glycol and said polymerization inhibitor is ammonium persulfate.

* * * * *